United States Patent
Suzuki et al.

(10) Patent No.: US 12,217,769 B1
(45) Date of Patent: Feb. 4, 2025

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventors: Sho Suzuki, Tokyo (JP); Takeyori Hara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/428,274

(22) Filed: Jan. 31, 2024

(30) Foreign Application Priority Data

Sep. 22, 2023 (JP) .................................. 2023-158709

(51) Int. Cl.
G11B 19/20 (2006.01)
H02P 6/182 (2016.01)
H02P 21/18 (2016.01)

(52) U.S. Cl.
CPC ...... *G11B 19/2081* (2013.01); *G11B 19/2009* (2013.01); *H02P 6/182* (2013.01); *H02P 21/18* (2016.02)

(58) Field of Classification Search
None
See application file for complete search history.

(56) References Cited

U.S. PATENT DOCUMENTS

| | | | | |
|---|---|---|---|---|
| 5,625,514 | A * | 4/1997 | Kubo | G11B 21/12 |
| 5,969,899 | A * | 10/1999 | Utenick | G11B 5/6005 |
| 6,396,652 | B1 * | 5/2002 | Kawachi | G11B 5/54 |
| 7,095,579 | B1 * | 8/2006 | Ryan | G11B 21/12 |
| 7,725,653 | B2 | 5/2010 | Long | |
| 7,787,211 | B2 | 8/2010 | Kim et al. | |
| 9,111,583 | B2 | 8/2015 | Trantham | |
| 9,972,348 | B1 * | 5/2018 | Ferris | G11B 19/047 |
| 2002/0167750 | A1 * | 11/2002 | Kurihara | G11B 21/12 |
| 2004/0100722 | A1 * | 5/2004 | Kokami | G11B 21/02 |
| 2012/0151162 | A1 * | 6/2012 | Trantham | G06F 1/3206 713/324 |
| 2016/0180877 | A1 * | 6/2016 | Nicholls | G11B 19/2081 360/71 |
| 2017/0024297 | A1 | 1/2017 | Sogabe | |

* cited by examiner

*Primary Examiner* — Peter Vincent Agustin
(74) *Attorney, Agent, or Firm* — Kim & Stewart LLP

(57) ABSTRACT

According to one embodiment, a controller of a magnetic disk device calculates a first power amount that is an amount of power required for an unload operation of a magnetic head based on a state of a VCM while the VCM is operating. The controller calculates a first set value based on the first power amount. When an amount of second data that is first data stored in a volatile memory and not yet written to a magnetic disk exceeds the first set value, the controller executes a first write operation of writing a part or all of the second data to the magnetic disk. When supply of power from outside is interrupted, the controller executes the unload operation and saving of the second data to a non-volatile memory by using power generated by a back electromotive force of the second motor.

20 Claims, 9 Drawing Sheets

MAGNETIC DISK DEVICE AND METHOD

CROSS-REFERENCE TO RELATED APPLICATIONS

This application is based upon and claims the benefit of priority from Japanese Patent Application No. 2023-158709, filed on Sep. 22, 2023; the entire contents of which are incorporated herein by reference.

FIELD

Embodiments described herein relate generally to a magnetic disk device and a method.

BACKGROUND

Conventionally, in a magnetic disk device, user data received from a host is temporarily stored in a volatile memory, and then the user data stored in the volatile memory is written to a magnetic disk.

In addition, a magnetic disk device capable of executing a power loss protection (PLP) operation is known. In the PLP operation, when power loss occurs, user data in the volatile memory that has not yet been written to the magnetic disk is saved in a nonvolatile memory by backup power. This operation prevents user data in the volatile memory that has not yet been written to the magnetic disk from being lost from the magnetic disk device.

DETAILED DESCRIPTION

In general, according to one embodiment, a magnetic disk device includes a magnetic disk, a magnetic head, a first motor, a second motor, a nonvolatile memory, a volatile memory, and a controller. The magnetic head is configured to write to and read from the magnetic disk. The first motor is configured to move the magnetic head relative to the magnetic disk in a radial direction. The second motor is configured to rotate the magnetic disk. The volatile memory is configured to store first data that is data received from a host device at least until the first data is written to the magnetic disk. The controller is configured to calculate a first power amount that is an amount of power required for an unload operation of the magnetic head based on a first state of the first motor while the first motor is operating. The controller is configured to calculate a first set value based on the first power amount. When an amount of second data that is the first data stored in the volatile memory and not yet written to the magnetic disk exceeds the first set value, the controller is configured to execute a first write operation of writing a part or all of the second data to the magnetic disk. When supply of power from outside is interrupted, the controller is configured to execute the unload operation and saving of the second data to the nonvolatile memory by using power generated by a back electromotive force of the second motor.

Exemplary embodiments of a magnetic disk device and a method will be described below in detail with reference to the accompanying drawings. Note that the present invention is not limited by the following embodiments.

First Embodiment

Figure 1:
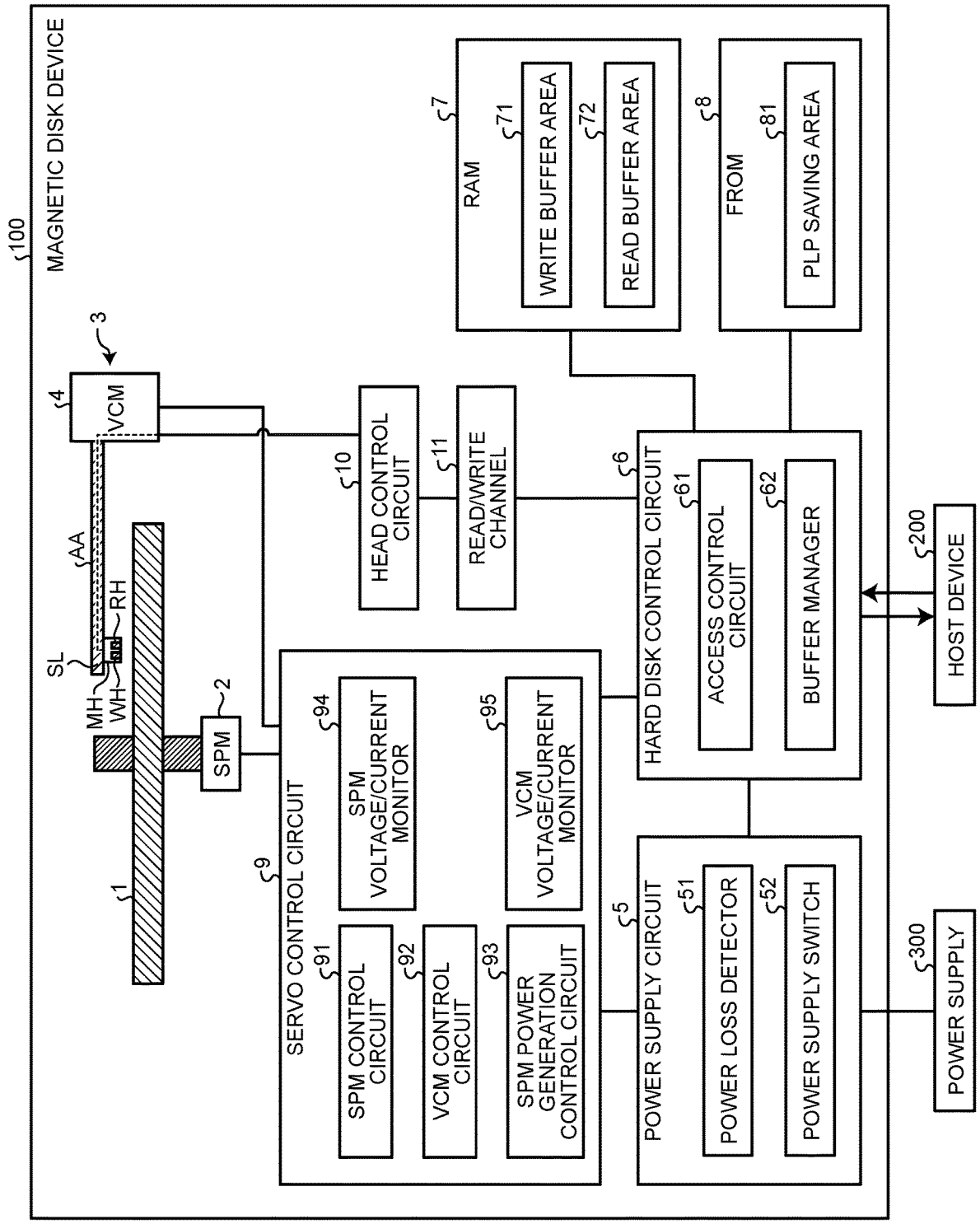
FIG. 1 is a block diagram illustrating an example of a configuration of a disk device according to a first embodiment.

FIG. 1 is a block diagram illustrating an example of a configuration of a disk device according to a first embodiment. A magnetic disk device 100 is connectable to a host device 200. The magnetic disk device 100 functions as an external storage device of the host device 200. The magnetic disk device 100 is connected to a power supply 300 provided outside. The magnetic disk device 100 operates by using power supplied from the power supply 300.

The magnetic disk device 100 includes a magnetic disk 1, a spindle motor (SPM) 2, a magnetic head MH, an actuator arm AA, a voice coil motor (VCM) 3, a power supply circuit 5, a hard disk control circuit 6, a random access memory (RAM) 7, a flash read only memory (FROM) 8, a servo control circuit 9, a head control circuit 10, and a read/write channel 11.

The magnetic disk device 100 receives an access command from the host device 200. The magnetic disk device 100 writes data to the magnetic disk 1 or reads data from the magnetic disk 1 in response to the received access command.

The access command includes a logical address. The magnetic disk device 100 provides a logical address space to the host device 200. The logical address indicates a position in the address space. The host device 200 designates a position where data is written or a position where data is read by using the logical address. Note that the logical address is referred to as a logical block address (LBA).

A magnetic layer capable of recording various types of information is provided on a surface of the magnetic disk 1. The magnetic disk device 100 may include one magnetic disk 1 or may include a plurality of magnetic disks 1 provided coaxially. FIG. 1 illustrates only one magnetic disk 1 for ease of description.

Figure 2:
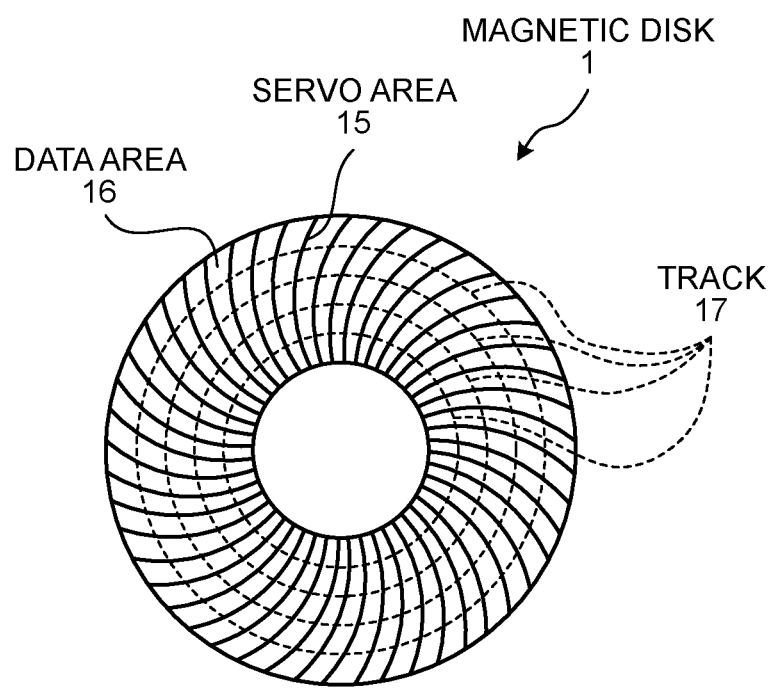
FIG. 2 is a diagram illustrating an example of a configuration of a magnetic disk according to the first embodiment.

FIG. 2 is a diagram illustrating an example of a configuration of the magnetic disk 1 according to the first embodiment. Servo data used for positioning the magnetic head MH is written to the magnetic layer formed on the surface of the magnetic disk 1 by, for example, a servo writer or self-servo write (SSW).

FIG. 2 illustrates servo areas 15 arranged radially as an example of an arrangement of servo areas in which servo data is written. In a circumferential direction, a space between the two servo areas 15 is a data area 16 where data can be written. A plurality of concentric tracks 17 is provided in the radial direction of the magnetic disk 1. The data area 16 on the track 17 is provided with a plurality of sectors in which data of a predetermined size is written. The predetermined size is a sector size.

The servo data includes a servo mark, a gray code, a burst pattern, and a post code. When data is written to the magnetic disk 1 or data is read from the magnetic disk 1, positioning of the magnetic head MH, that is, seek control and tracking control, is executed on the basis of servo data read from the servo area 15 by the magnetic head MH.

The recording surface of the magnetic disk 1 is divided into at least two areas having different uses. One of the at least two areas is an LBA area, and the other one of the at least two areas is a media cache area.

Figure 3:
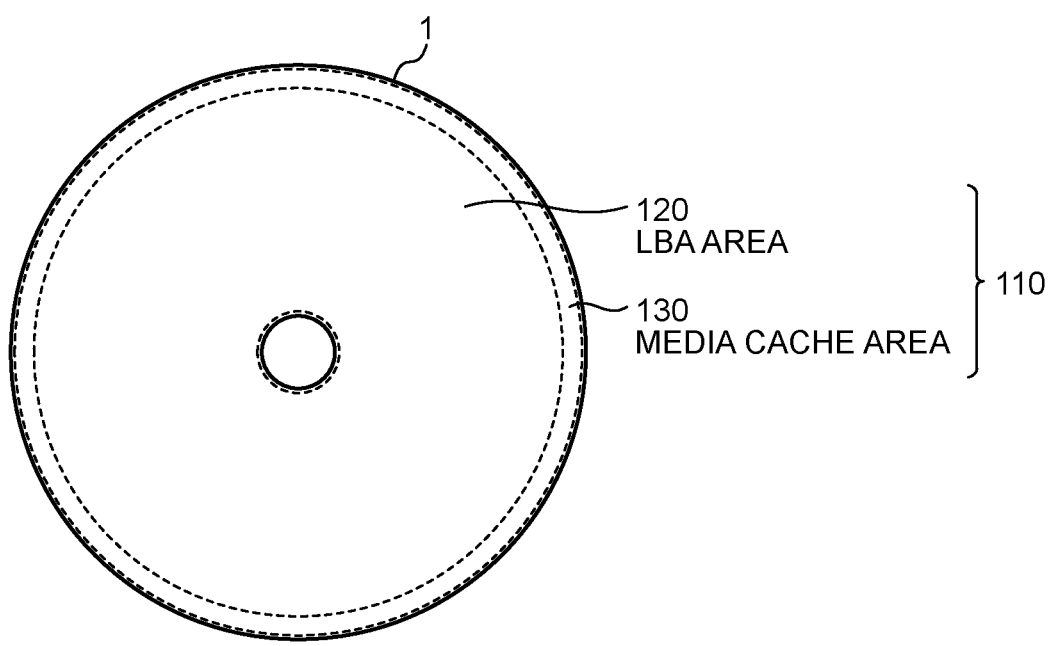
FIG. 3 is a diagram illustrating an example of a plurality of areas configured on a recording surface of the magnetic disk according to the first embodiment.

FIG. 3 is a diagram illustrating an example of a plurality of areas configured on the recording surface of the magnetic disk 1 according to the first embodiment.

In the example illustrated in FIG. 3, an LBA area 120 is provided on an inner diameter side and a media cache area 130 is provided on an outer diameter side pf the recording surface 110 of the magnetic disk 1.

An LBA is mapped in the LBA area 120. The host device 200 can designate a write destination position or a read destination position in the LBA area 120 by using the LBA. The LBA area 120 is a final storage destination of user data received from the host device 200. Note that user data received from the host device 200, that is, user data requested to be written by a write command, is referred to as write data.

The media cache area 130 is used as a temporary storage location of write data.

The number and positions of the media cache areas 130 provided on the recording surface 110 are not limited to the example illustrated in FIG. 3. The number and positions of the LBA area 120 provided on the recording surface 110 are not limited to the example illustrated in FIG. 3. The recording surface 110 may be provided with an area for an arbitrary use in addition to the LBA area 120 and the media cache area 130.

The description returns to FIG. 1. Data is written to and read from the magnetic disk 1 via the magnetic head MH. The magnetic head MH is provided at one end of the actuator arm AA, and writes and reads data to and from the magnetic disk 1. The magnetic head MH includes a write head WH that writes data to the magnetic disk 1 and a read head RH that reads data from the magnetic disk 1. The magnetic head MH is supported on a slider SL.

The SPM 2 rotates the magnetic disk 1. The magnetic head MH moves relative to the surface of the magnetic disk 1 in the circumferential direction while maintaining a slightly floating state from the surface of the magnetic disk 1 by a lift generated by the rotation of the magnetic disk 1.

The VCM 3 is provided at an end of the actuator arm AA opposite to the end where the magnetic head MH is provided. The VCM 3 rotationally drives the actuator arm AA about a shaft 4. As a result, the VCM 3 moves the magnetic head MH relative to the magnetic disk 1 in the radial direction.

When the rotation of the magnetic disk 1 is stopped, for example, the VCM 3 moves the magnetic head MH to a ramp mechanism (not illustrated). The ramp mechanism is provided at a position separated from the magnetic disk 1 and is configured to be able to hold the magnetic head MH. The operation of moving the magnetic head MH from the magnetic disk 1 to the ramp mechanism is referred to as an unload operation.

The head control circuit 10 writes data to the magnetic disk 1 by causing a write signal corresponding to data input from the read/write channel 11 to flow to the write head WH. In addition, the head control circuit 10 amplifies a read signal output from the read head RH and supplies the amplified read signal to the read/write channel 11.

The read/write channel 11 code-modulates write data stored in the write buffer area 71 and outputs the code-modulated write data to the head control circuit 10. In addition, the read/write channel 11 code-demodulates data transmitted from the head control circuit 10 and outputs the code-demodulated data to a read buffer area 72.

The RAM 7 is a volatile memory capable of high-speed operation. In the RAM 7, the write buffer area 71 and the read buffer area 72 are allocated.

The write buffer area 71 is an area in which write data received from the host device 200 is stored at least until the write data is written to the magnetic disk 1. The write data received from the host device 200 is temporarily stored in the write buffer area 71 and then written from the write buffer area 71 to the magnetic disk 1.

The read buffer area 72 is an area in which user data read from the magnetic disk 1 by a user who is requested to read by a read command is temporarily stored. The data read from the magnetic disk 1 is stored in the read buffer area 72, and then the data is transferred from the read buffer area 72 to the host device 200.

In addition to the write buffer area 71 and the read buffer area 72, the RAM 7 can include an area in which various data or programs used by the hard disk control circuit 6 and the like are loaded.

The FROM 8 is a nonvolatile memory in which various data or programs used by the hard disk control circuit 6 and the like are stored. A PLP saving area 81 is further allocated in the FROM 8. The write data in the write buffer area 71 is saved in the PLP saving area 81 by the PLP operation.

The PLP operation is an operation of saving, in the nonvolatile memory, write data that has not yet been stored in the magnetic disk 1 among the write data stored in the write buffer area 71 when power loss occurs. The PLP operation prevents the write data that has not yet been written to the magnetic disk 1 from being lost from the magnetic disk device 100. Therefore, the write data received in the write buffer area 71 is protected from being lost from the magnetic disk device 100.

Note that the power loss is unrighteous interruption of power supply from the power supply 300. The power loss may include interruption of power supply from the power supply 300 according to a normal sequence.

The servo control circuit 9 includes an SPM control circuit 91, a VCM control circuit 92, an SPM power generation control circuit 93, an SPM voltage/current monitor 94, and a VCM voltage/current monitor 95.

The SPM control circuit 91 controls the rotation of the SPM 2. The SPM voltage/current monitor 94 monitors a voltage value and a current value of power supplied to the SPM 2. The SPM voltage/current monitor 94 includes a circuit that measures a voltage value and a current value for the power supplied to the SPM 2, and repeatedly measures the voltage value and the current value by the circuit. The SPM control circuit 91 can use the voltage value and the current value acquired by the SPM voltage/current monitor 94 for controlling the rotation of the SPM 2.

The VCM control circuit 92 controls the rotation of the VCM 3. The VCM voltage/current monitor 95 monitors a voltage value and a current value of power supplied to the VCM 3. The VCM voltage/current monitor 95 includes a circuit that measures a voltage value and a current value for the power supplied to the VCM 3, and repeatedly measures the voltage value and the current value by the circuit. The VCM control circuit 92 can use the voltage value and the current value acquired by the VCM voltage/current monitor 95 for controlling the rotation of the VCM 3.

The SPM power generation control circuit 93 generates power by using the back electromotive force generated in the SPM 2 when power loss occurs. When the power loss occurs, the hard disk control circuit 6 starts the PLP operation. In the PLP operation, since power from the power supply 300 cannot be used, a back electromotive force generated when the SPM 2 continues to rotate by inertia is used. The SPM power generation control circuit 93 supplies the back electromotive force generated by the SPM 2 to each circuit of the magnetic disk device 100 via a power supply switch 52 provided in the power supply circuit 5.

The power supply circuit 5 supplies power to each circuit of the magnetic disk device 100. The power supply circuit 5 includes a power loss detector 51 and the power supply switch 52.

The power loss detector 51 detects a power loss. For example, the power loss detector 51 monitors a voltage of a power supply line for receiving supply of power from the power supply 300. When a value of the voltage of the power supply line is larger than a predetermined threshold, it is determined that no power loss has occurred. When the value of the voltage of the power supply line becomes smaller than the threshold, the power loss detector 51 determines that the power loss has occurred. A value slightly smaller than the value of a voltage necessary for the magnetic disk device 100 to operate normally is used as the threshold value. Note that a method of detecting a power loss by the power loss detector 51 is not limited to the above method.

The power supply switch 52 switches a power supply source for driving each circuit of the magnetic disk device 100. During a period in which no power loss is detected by the power loss detector 51, the power supply switch 52 supplies power supplied from the power supply 300 to each circuit of the magnetic disk device 100. In response to a detection of a power loss by the power loss detector 51, the power supply switch 52 supplies the power generated by the SPM power generation control circuit 93 by the back electromotive force of the SPM 2 to each circuit of the magnetic disk device 100.

The hard disk control circuit 6 includes an access control circuit 61 and a buffer manager 62. The hard disk control circuit 6 is an example of a controller.

The access control circuit 61 interprets an access command received from the host device 200. In addition, the access control circuit 61 controls data transfer between the magnetic disk 1 and each of the buffer areas 71 and 72 and data transfer between each of the buffer areas 71 and 72 and the host device 200 on the basis of the access command.

When receiving a write command from the host device 200, the access control circuit 61 stores write data requested to be written by the write command in the write buffer area 71. When the storage of the write data in the write buffer area 71 is completed, the access control circuit 61 notifies the host device 200 of the completion of the execution of the write command. The completion of execution of the write command can be notified before the write data is stored in the LBA area 120. Therefore, a transfer rate of the write data from the host device 200 to the magnetic disk device 100, that is, write performance is improved.

In the first embodiment, the capacity of the write buffer area 71 is set to be relatively large in order to increase the write performance as much as possible.

The access control circuit 61 executes command reordering when the write data in the write buffer area 71 is written to the magnetic disk 1. The command reordering is an operation of determining an order of writing of pieces of write data so that writing of the pieces write data can be completed as soon as possible when the plurality of write data in the write buffer area 71 is written to the magnetic disk 1. Therefore, the order of writing the pieces of write data to the magnetic disk 1 may be different from an order of receiving a corresponding plurality of write commands.

Since the capacity of the write buffer area 71 is set to be relatively large, the efficiency of command reordering is improved.

While the capacity of the write buffer area 71 is set to be relatively large in this manner, the amount of data that can be saved in the PLP saving area 81 by the PLP operation is variously limited. As described above, the PLP operation is performed by utilizing the back electromotive force generated in the SPM 2. Since the power generation by the back electromotive force can be maintained only while the SPM 2 is rotating by inertia, an upper limit amount of data that can be saved from the write buffer area 71 to the PLP saving area 81 depends on an amount of power generated by the back electromotive force and the like. It is therefore impossible to save all the write data stored in the write buffer area 71 to the PLP saving area 81 without omission.

Therefore, the access control circuit 61 copies the write data stored in the write buffer area 71 to the media cache area 130 in a timely manner. Among the write data stored in the write buffer area 71, original write data whose copy is written to the media cache area 130 is lost from the write buffer area 71 when a power loss occurs. After supply of power from the power supply 300 is resumed, the same write data as the original write data is restored in the write buffer area 71 on the basis of the copy stored in the media cache area 130.

Among the write data stored in the write buffer area 71, all the write data that has not yet been copied to the media cache area 130 is saved in the PLP saving area 81 in accordance with the power loss. Therefore, the amount of write data that has not yet been copied to the media cache area 130 among the write data stored in the write buffer area 71 is controlled so as not to exceed a PLP set value as much as possible. The PLP set value corresponds to the upper limit amount of data to be saved in the PLP saving area 81, and it is guaranteed that the user data up to the amount of the PLP set value can be saved in the PLP saving area 81 without omission.

Hereinafter, write data that has not yet been written to the LBA area 120 after being received from the host device 200 will be referred to as temporarily stored data. The temporarily stored data includes write data stored in the write buffer area 71, a copy of the write data stored in the media cache area 130, and the write data saved in the PLP saving area 81.

Among the write data in the write buffer area 71, write data whose copy is not yet written to the media cache area 130 is referred to as unprotected temporarily stored data.

A copy of the write data written to each media cache area 130 is referred to as copy data.

An operation of copying the write data stored in the write buffer area 71 to the media cache area 130 is referred to as a first write operation. An operation of writing the write data stored in the write buffer area 71 to the LBA area 120 is referred to as a second write operation.

Figure 4:
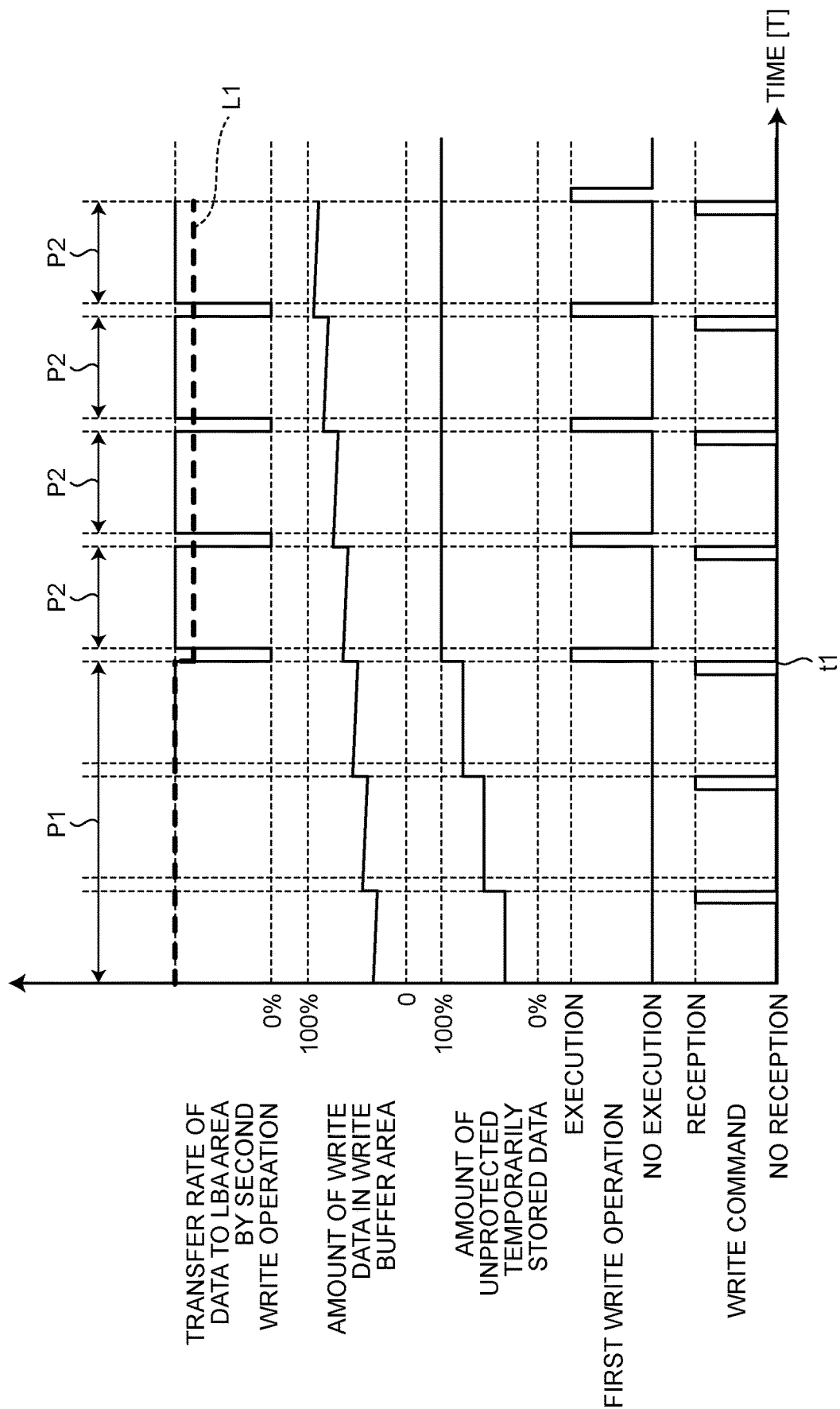
FIG. 4 is a diagram for describing an example of transition of an amount of write data stored in a write buffer area according to the first embodiment.

FIG. 4 is a diagram for describing an example of transition of an amount of write data stored in the write buffer area 71 according to the first embodiment. The drawing illustrates a timing of reception of the write command, a timing of executing the first write operation, a temporal transition of the amount of unprotected temporarily stored data, a temporal transition of the amount of write data in the write buffer area 71, and a temporal transition of a data transfer amount to the LBA area 120 by the second write operation.

The amount of write data in the write buffer area 71 is indicated by numerical information of a percentage in which the capacity of the write buffer area 71 is set to 100%. The amount of unprotected temporarily stored data is indicated by numerical information of a percentage in which the PLP set value is set to 100%.

As illustrated in FIG. 4, the write data is stored in the write buffer area 71 upon receipt of the write command. Thus, the amount of write data in the write buffer area 71 increases. In addition, the amount of unprotected temporarily stored data increases upon receipt of the write command. Then, after the amount of unprotected temporarily stored data reaches the PLP set value (timing t1), the first write operation is started.

In a period P1 before the timing t1 at which the first write operation is first executed, the magnetic disk device 100 continuously executes the second write operation. In a period after the timing t1, the first write operation is executed every time the amount of unprotected temporarily stored data reaches the PLP set value. In a period in which the first write operation is not executed, that is, the period P1 and each period P2 in FIG. 4, the second write operation is executed. Therefore, the amount of write data in the write buffer area 71 gradually decreases except for each timing at which the write data is stored in the write buffer area 71 in response to the write command.

The data transfer amount to the LBA area 120 by the second write operation has a maximum value in the period P1 and each period P2 in FIG. 4, and becomes zero at each timing when the first write operation is executed.

The data transfer amount to the LBA area 120 by the second write operation can be regarded as a transfer rate of the write data to the magnetic disk 1. Therefore, in the period after the timing t1, a line Li obtained by averaging the data transfer amount to the LBA area 120 by the second write operation corresponds to the transfer rate of the write data to the magnetic disk 1. As is clear from the line Li, in the period after the timing t1, the transfer rate of the write data to the magnetic disk 1 deteriorates by the first write operation being executed occasionally.

When the transfer rate of the write data to the magnetic disk 1 deteriorates, the transfer rate of the write data from the host device 200 to the magnetic disk device 100 (write performance in the present specification) can also deteriorate.

In the embodiment, in order to suppress the deterioration of the transfer rate to the magnetic disk 1 due to the execution of the first write operation as much as possible, an execution frequency of the first write operation is reduced as much as possible. Specifically, the hard disk control circuit 6 reduces the execution frequency of the first write operation as much as possible by increasing the PLP set value as much as possible. By reducing the execution frequency of the first write operation, the write performance is improved.

Here, a technique to be compared with the first embodiment will be described. A technique to be compared with the embodiment is referred to as a comparative example. In the comparative example, the PLP set value is a fixed value. In a manufacturing process, a fixed value common to a large number of magnetic disk devices is set as the PLP set value for each magnetic disk device. A worst value of the amount of data that can be saved by the PLP operation is estimated, and the PLP set value is determined on the basis of the worst value. Then, the PLP set value is set in the large number of magnetic disk devices.

The amount of power that is usable for the PLP operation can vary depending on a condition (for example, motor temperature of the SPM or VCM) at the time of operation of the magnetic disk device. Therefore, the amount of data that can be saved by the PLP operation can vary depending on the condition. However, in the comparative example, the PLP set value is set on the basis of the worst value of the amount of data that can be saved by the PLP operation. Therefore, there is room for increasing data that can be saved by the PLP operation.

In the first embodiment, the buffer manager 62 capable of dynamically changing the PLP set value is provided. The buffer manager 62 acquires the state of each of the motors 2 and 3 while the magnetic disk device 100 is performing a normal operation, and estimates the amount of power usable for the PLP operation on the basis of the acquired state. Then, the buffer manager 62 determines the PLP set value on the basis of the estimated power amount. As a result, the PLP set value can be increased as compared with the comparative example, and the execution frequency of the first write operation can be suppressed.

A method of determining the PLP set value will be described below.

At the time of a power loss, the unload operation is executed before the start of the PLP operation in order to prevent the magnetic head MH from being attracted to the magnetic disk 1. Therefore, the following Formula (1) is established.

$$P_{gSPM} \geq P_{UL} + P_{PLP} \quad (1)$$

$P_{gSPM}$ is an amount of power generated by the back electromotive force generated in the SPM 2. Hereinafter, the amount of power generated by the back electromotive force generated in the SPM 2 is referred to as an SPM power generation amount. $P_{UL}$ is a power consumption amount in the unload operation, precisely, an amount of power consumed in the VCM 3 in the unload operation. The power consumption amount in the unload operation is referred to as an unload power consumption amount. $P_{PLP}$ is an amount of power used for saving data by the PLP operation. The amount of power used for saving data by the PLP operation is referred to as PLP power amount.

By modifying Formula (1), the following Formula (2) is obtained.

$$P_{PLP} \leq P_{gSPM} - P_{UL} \quad (2)$$

As is clear from Formula (2), a maximum amount of power obtained by subtracting the unload power consumption amount $P_{UL}$ from the SPM power generation amount $P_{gSPM}$ can be used for saving data by the PLP operation.

A PLP set value $C_{PLP}$ is determined in accordance with the PLP power amount $P_{PLP}$. Therefore, the PLP set value $C_{PLP}$ can be derived by the following Formula (3).

$$C_{PLP} \leq C_{ref} * (P_{PLP}/P_{PLPref}) \quad (3)$$

$C_{ref}$ is a reference value of the PLP set value. $P_{PLPref}$ is a reference value of the PLP power amount, and is the PLP power amount required for saving the write data of the amount of $C_{ref}$.

The unload power consumption amount $P_{UL}$ depends on a coil temperature of the VCM 3. For example, in a situation where a seek is continuously generated, a coil resistance of the VCM 3 increases due to heat generation of a coil of the VCM 3. As a result, the power consumption amount of the VCM 3 in the unload operation, that is, the unload power consumption amount $P_{UL}$ increases.

The power consumption amount $P_{UL}$ can be expressed by the following Formula (4). In Formula (4), $R_{VCM}$ is the coil resistance of the VCM 3. $I_{VCM}$ is a current flowing through the VCM 3.

As is clear from Formula (4), a power consumption $P_{UL}$ increases in proportion to the coil resistance $R_{VCM}$ of the VCM 3. Therefore, the hard disk control circuit 6 estimates the power consumption amount $P_{UL}$ on the basis of the following Formula (5).

$$P_{ULest} = P_{ULref} * (R_{VCMest}/R_{VCMref}) \qquad (5)$$

$P_{ULest}$ is an estimated value of the unload power consumption amount. $R_{VCMref}$ is a reference value of the coil resistance of the VCM 3. $P_{ULref}$ is a reference value of the unload power consumption amount, and specifically, is the unload power consumption amount when a coil resistance value of the VCM 3 is $R_{VCMref}$. $R_{VCMest}$ is an estimated value of the coil resistance of the VCM 3.

The SPM power generation amount $P_{gSPM}$ is obtained by the following Formula (6).

$$P_{gSPM} = \int (I_{SPM} * V_{EMF}) dt = \int \frac{V_{EMF}^2}{R_{SPM} + R_{Load}} dt \qquad (6)$$

$I_{SPM}$ is an induced current flowing by a back electromotive voltage of the SPM 2. $V_{EMF}$ is a back electromotive voltage generated in the SPM 2. $R_{SPM}$ is a coil resistance of the SPM 2. $R_{LOAD}$ is a resistance of a load that consumes the back electromotive force of the SPM 2.

When a coil temperature of the SPM 2 increases, the coil resistance $R_{SPM}$ of the SPM 2 increases. When the coil resistance $R_{SPM}$ of the SPM 2 increases, the SPM power generation amount $P_{gSPM}$ decreases. Therefore, the hard disk control circuit 6 estimates the power generation amount $P_{gSPM}$ of the SPM 2 on the basis of the following Formula (7).

$$P_{gSPMest} = P_{gSPMref} * (R_{SPMest}/R_{SPMref}) \qquad (7)$$

$P_{gSPMest}$ is an estimated value of the SPM power generation amount. $R_{SPMest}$ is an estimated value of the coil resistance of the SPM 2. $R_{SPMref}$ is a reference value of the coil resistance of the SPM 2. $P_{gSPMref}$ is a reference value of the SPM power generation amount, precisely, the SPM power generation amount when the coil resistance of the SPM 2 is $R_{SPMref}$.

The buffer manager 62 illustrated in FIG. 1 sets the PLP set value $C_{PLP}$ on the basis of a relationship between the values described above.

Figure 5:
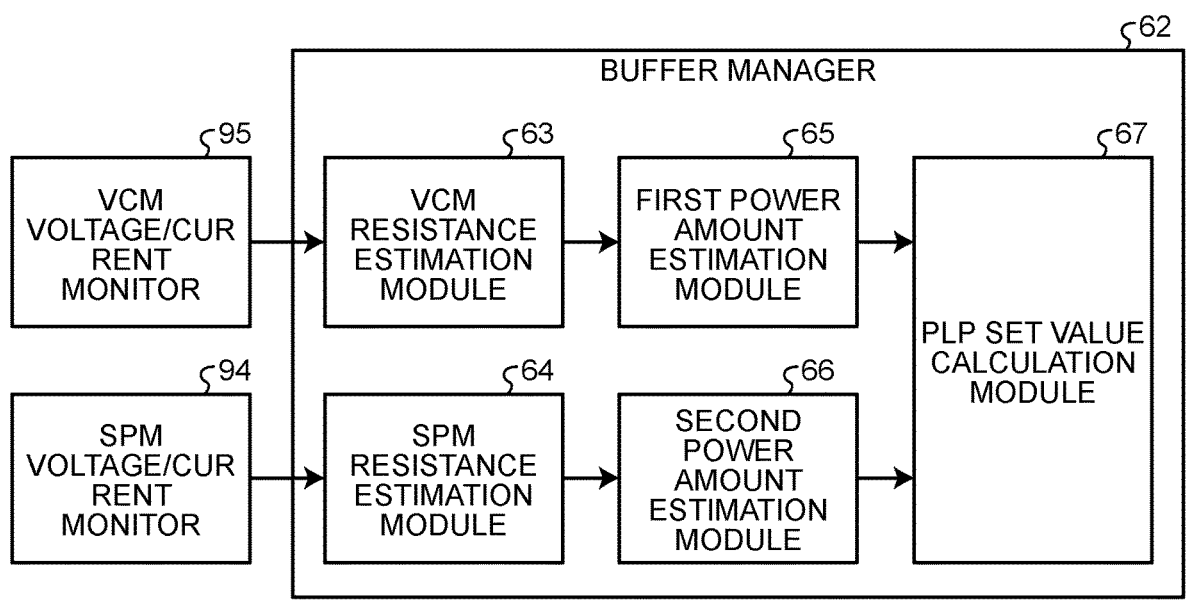
FIG. 5 is a diagram illustrating an example of a more detailed configuration of a cache manager according to the first embodiment.

FIG. 5 is a diagram illustrating an example of a more detailed configuration of the buffer manager 62 according to the first embodiment. In the example illustrated in the drawing, the buffer manager 62 includes a VCM resistance estimation module 63, an SPM resistance estimation module 64, a first power amount estimation module 65, a second power amount estimation module 66, and a PLP set value calculation module 67.

The VCM resistance estimation module 63 acquires a current value and a voltage value of the power supplied to the VCM 3 measured by the VCM voltage/current monitor 95. Then, the VCM resistance estimation module 63 calculates an estimated value $R_{VCMest}$ of the coil resistance of the VCM 3 on the basis of the current value and the voltage value of the power supplied to the VCM 3. For example, the VCM resistance estimation module 63 acquires the estimated value $R_{VCMest}$ of the coil resistance of the VCM 3 by dividing the acquired voltage value by the acquired current value.

The first power amount estimation module 65 calculates the estimated value $P_{ULest}$ of the unload power consumption amount on the basis of the estimated value $R_{VCMest}$ of the coil resistance obtained by the VCM resistance estimation module 63 and Formula (5). Note that each of the reference values $P_{ULref}$ and $R_{VCMref}$ is set in advance by a designer. Each of the reference values $P_{ULref}$ and $R_{VCMref}$ may be set to a value common to the large number of magnetic disk devices 100, or may be set to a different value for each magnetic disk device 100.

The SPM resistance estimation module 64 acquires the current value and the voltage value of the power supplied to the SPM 2 measured by the SPM voltage/current monitor 94. Then, the SPM resistance estimation module 64 calculates an estimated value $R_{SPMest}$ of the coil resistance of the SPM 2 on the basis of the current value and the voltage value of the power supplied to the SPM 2. For example, the SPMresistance estimation module 64 acquires the estimated value $R_{SPMest}$ of the coil resistance of the SPM 2 by dividing the acquired voltage value by the acquired current value.

The second power amount estimation module 66 calculates the estimated value $P_{gSPMest}$ of the SPM power generation amount on the basis of the estimated value $R_{SPMest}$ of the coil resistance obtained by the SPM resistance estimation module 64 and Formula (7). Note that each of the reference values $R_{SPMref}$ and $P_{gSPMref}$ is set in advance by the designer. Each of the reference values $R_{SPMref}$ and $P_{gSPMref}$ may be set to a value common to the large number of magnetic disk devices 100, or may be set to a different value for each magnetic disk device 100.

The PLP set value calculation module 67 calculates the PLP set value $C_{PLP}$.

Specifically, the PLP set value calculation module 67 calculates a maximum value $P_{PLPmax}$ of the amount of power that is usable in the PLP operation on the basis of the estimated value $P_{ULest}$ of the unload power consumption amount, the estimated value $P_{gSPMest}$ of the SPM power generation amount, and Formula (2). The PLP set value calculation module 67 calculates a maximum value $C_{PLPmax}$ that can be set as the PLP set value $C_{PLP}$ on the basis of the maximum value $P_{PLPmax}$ and Formula (3). Note that each of the reference values $P_{PLPref}$ and $C_{ref}$ is set in advance by the designer. Each of the reference values $P_{PLPref}$ and $C_{ref}$ may be set to a value common to the large number of magnetic disk devices 100, or may be set to a different value for each magnetic disk device 100. The PLP set value calculation module 67 determines the PLP set value $C_{PLP}$ on the basis of the maximum value $C_{PLPmax}$ obtained by the calculation. The PLP set value calculation module 67 may determine the maximum value $C_{PLPmax}$ as the PLP set value $C_{PLP}$, or may obtain the PLP set value $C_{PLP}$ by subtracting a predetermined margin from the maximum value $C_{PLPmax}$.

Next, the operation of the magnetic disk device 100 according to the first embodiment will be described.

Figure 6:
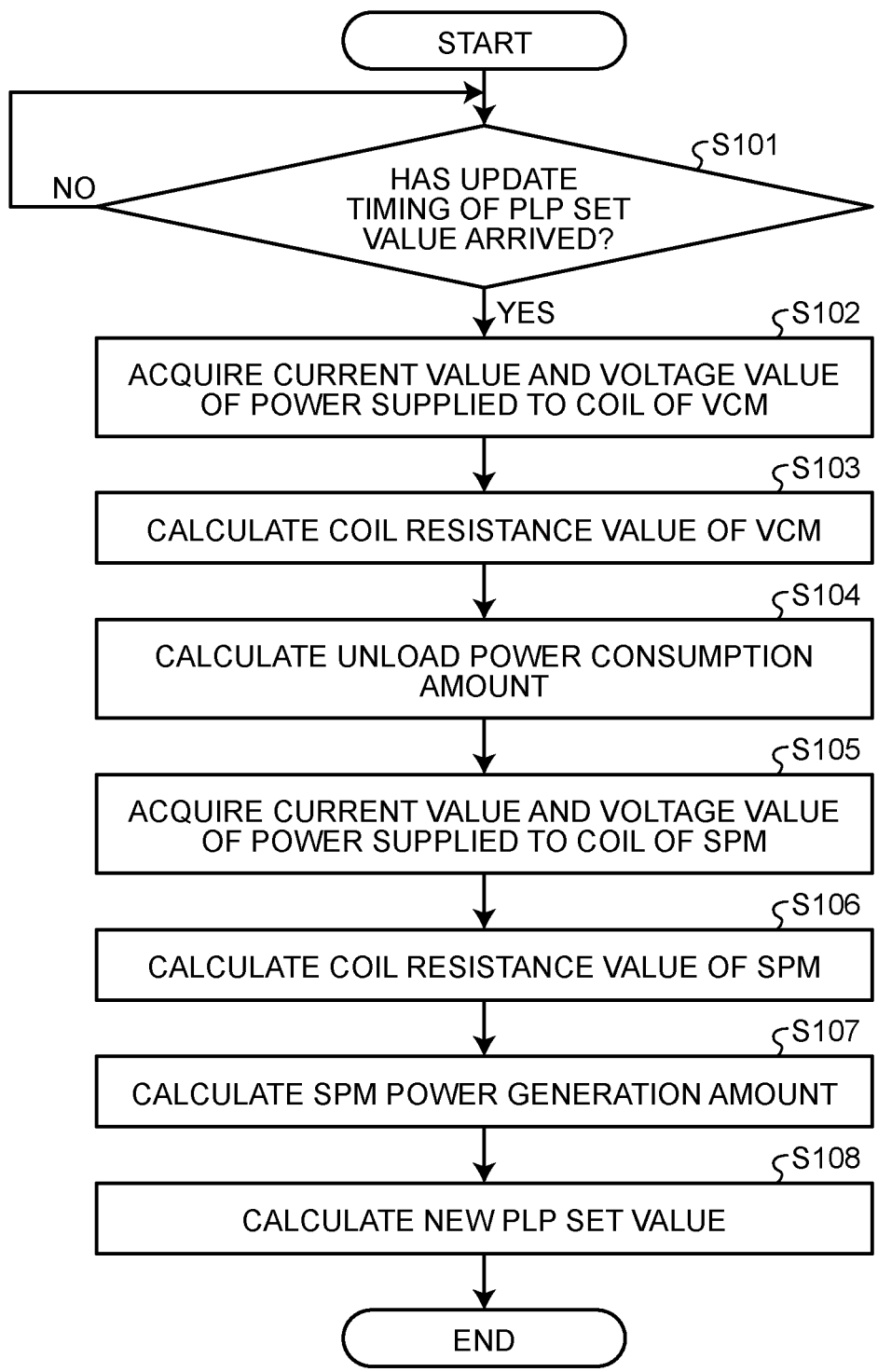
FIG. 6 is a flowchart illustrating an example of an operation of the cache manager according to the first embodiment.

FIG. 6 is a flowchart illustrating an example of an operation of the buffer manager 62 according to the first embodiment.

The buffer manager 62 determines whether an update timing of the PLP set value has arrived (S101). The designer can set a method of determining the update timing of the PLP set value. For example, the update timing of the PLP set value may be set to arrive at a predetermined temporal cycle. In another example, the update timing of the PLP set value may be set to arrive at a timing when a predetermined time elapses after the magnetic disk device 100 is activated.

Note that a predetermined initial value can be used as the PLP set value before the first update timing. The initial value may be set by a method as in the comparative example described above. Alternatively, the PLP set value used before a previous operation is stopped may be used as the initial value.

The update timing of the PLP set value is set so as to arrive a plurality of times at different timings after activation. The update timing of the PLP set value may be set so as to arrive only once after activation.

When the update timing of the PLP set value has not arrived (S101: No), the processing of S101 is executed again.

When the update timing of the PLP set value arrives (S101: Yes), the VCM resistance estimation module 63 acquires the current value and the voltage value of the power supplied to the VCM 3 from the VCM voltage/current monitor 95 (S102).

The VCM resistance estimation module 63 acquires the current value and the voltage value from the VCM voltage/current monitor 95 while power is being supplied to the VCM 3, that is, while the VCM 3 is operating. Specifically, the VCM resistance estimation module 63 acquires a current value and a voltage value from the VCM voltage/current monitor 95 during a seek accompanying an access to the LBA area 120 or the media cache area 130. Alternatively, the VCM resistance estimation module 63 may forcibly activate a seek without access to the LBA area 120 or the media cache area 130 in order to acquire the current value and the voltage value, and acquire the current value and the voltage value from the VCM voltage/current monitor 95 during the forcibly activated seek.

The VCM resistance estimation module 63 calculates the coil resistance value (precisely, the estimated value $R_{VCMest}$) of the VCM 3 on the basis of the current value and the voltage value of the power supplied to the VCM 3 (S103).

The first power amount estimation module 65 calculates an unload power consumption amount (precisely, an estimated value $P_{ULest}$ of the unload power consumption amount) on the basis of the coil resistance value obtained by the VCM resistance estimation module 63 and Formula (5) (S104).

The SPM resistance estimation module 64 acquires the current value and the voltage value of the power supplied from the SPM voltage/current monitor 94 to the SPM 2 (S105). The SPM resistance estimation module 64 acquires the current value and the voltage value from the SPM voltage/current monitor 94 while power is being supplied to the SPM 2, that is, while the SPM 2 is operating.

The SPM resistance estimation module 64 calculates the coil resistance value (precisely, the estimated value $R_{SPMest}$) of the SPM 2 on the basis of the current value and the voltage value of the power supplied to the SPM 2 (S106).

The second power amount estimation module 66 calculates the estimated value $P_{gSPMest}$ of the SPM power generation amount (precisely, the SPM power generation amount) on the basis of the coil resistance value obtained by the SPM resistance estimation module 64 and Formula (7) (S107).

The PLP set value calculation module 67 calculates a new PLP set value on the basis of the unload power consumption amount, the SPM power generation amount, Formula (2), and Formula (3) (S108). The new PLP set value calculated in the processing of S108 is used for controlling the first write operation until the processing of S108 is executed next time.

Figure 7:
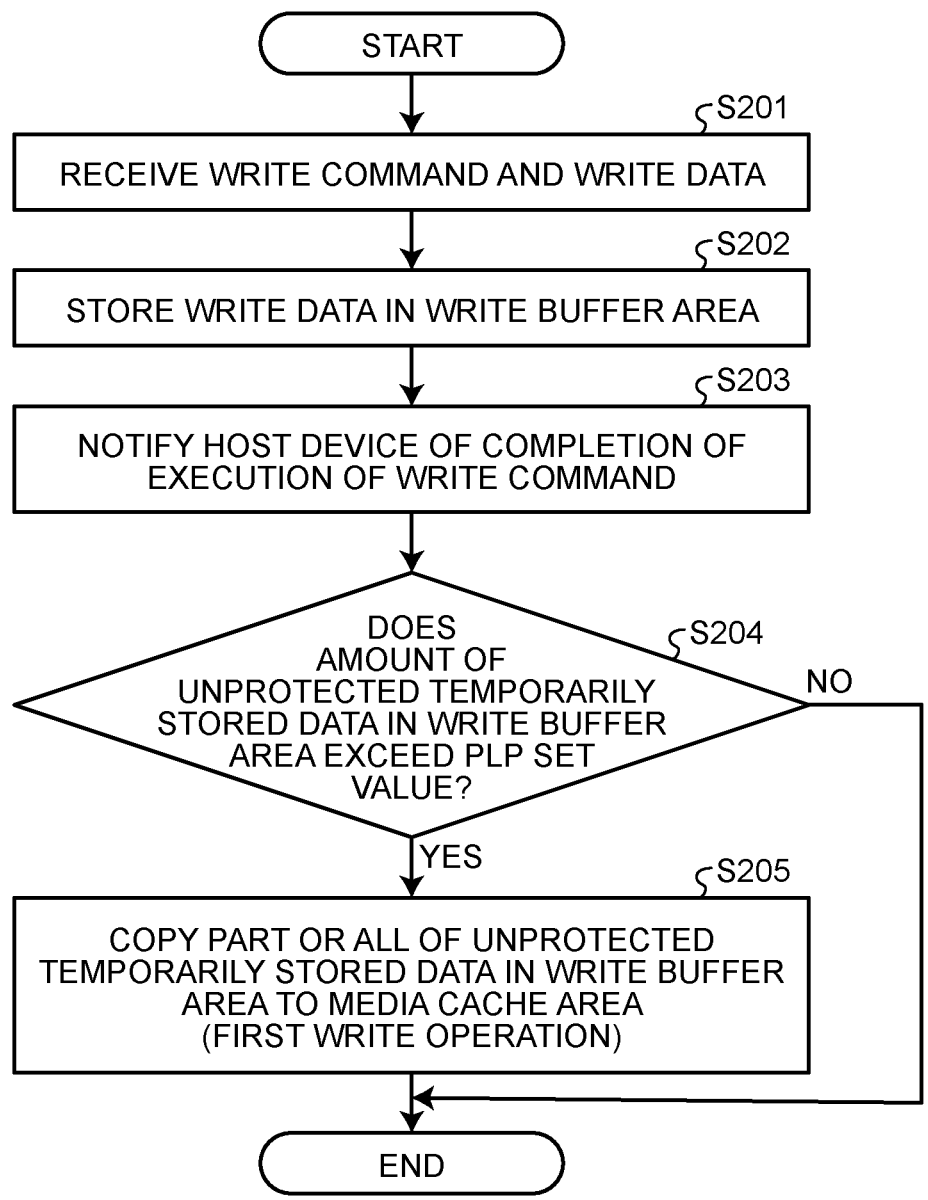
FIG. 7 is a flowchart illustrating an example of an operation in response to a write command according to the first embodiment.

FIG. 7 is a flowchart illustrating an example of an operation in response to the write command according to the first embodiment.

When the access control circuit 61 receives the write command and the write data (S201), the access control circuit 61 stores the write data in the write buffer area 71 (S202). Then, the access control circuit 61 notifies the host device 200 of a completion of the execution of the write command upon completion of the storage of the write data in the write buffer area 71 (S203).

The access control circuit 61 determines whether the amount of unprotected temporarily stored data in the write buffer area 71 exceeds the PLP set value (S204).

When the amount of unprotected temporarily stored data in the write buffer area 71 exceeds the PLP set value (S204: Yes), the access control circuit 61 copies the unprotected temporarily stored data to the media cache area 130 (S205). Note that the processing of S205 corresponds to the first write operation.

In the processing of S205, the access control circuit 61 may copy an amount of unprotected temporarily stored data exceeding the PLP set value to the media cache area 130. Alternatively, the access control circuit 61 may copy all of the unprotected temporarily stored data to the media cache area 130.

After the processing of S205, or when the amount of unprotected temporarily stored data in the write buffer area 71 does not exceed the PLP set value (S204: No), the operation in response to the write command ends.

Figure 8:
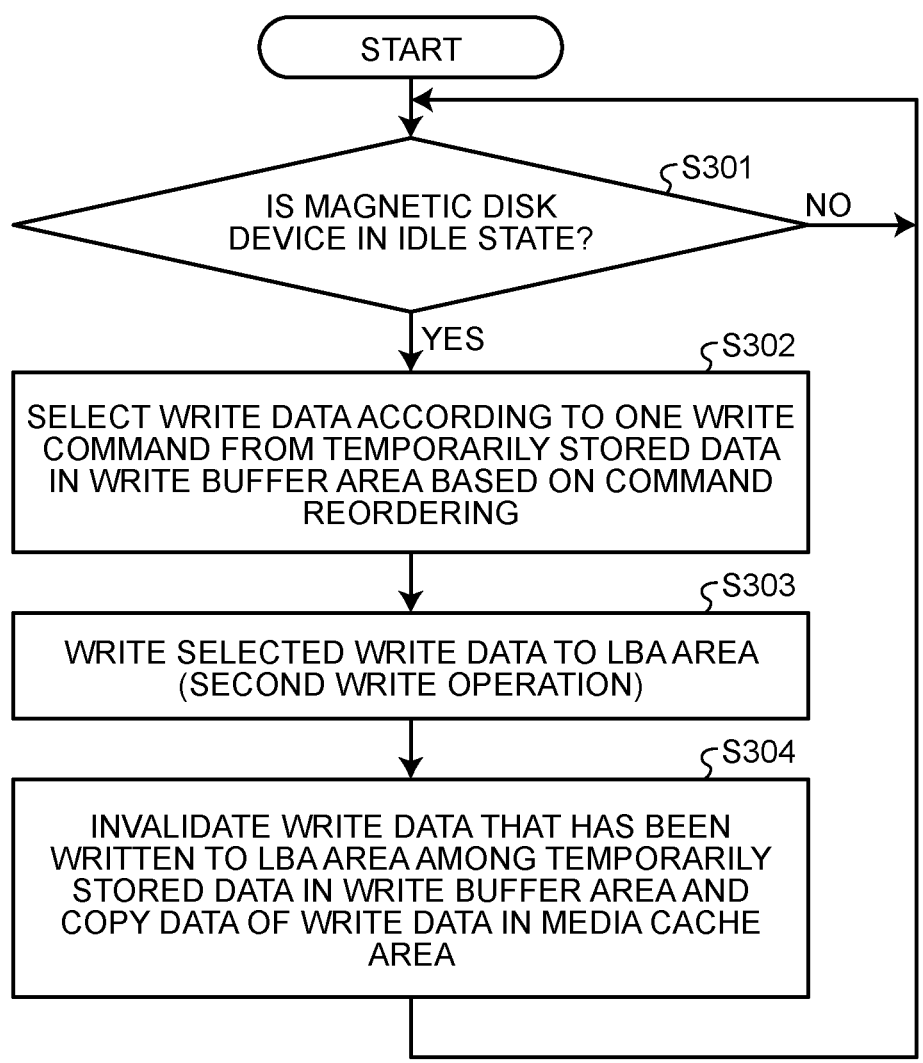
FIG. 8 is a flowchart illustrating an example of control of a second write operation according to the first embodiment.

FIG. 8 is a flowchart illustrating an example of control of the second write operation according to the first embodiment.

The access control circuit 61 determines whether the magnetic disk device 100 is in an idle state (S301). The idle state is, for example, a state in which a period during which there is no reception of an access command from the host device 200 exceeds a predetermined time.

When the magnetic disk device 100 is not in the idle state (S301: No), the access control circuit 61 executes the processing of S301 again.

When the magnetic disk device 100 is in the idle state (S301: Yes), the access control circuit 61 selects write data according to one write command from the temporarily stored data in the write buffer area 71 (S302). The access control circuit 61 selects the write data on the basis of the command reordering.

The access control circuit 61 writes the selected write data in the LBA area 120 (S303). Note that the processing of S303 corresponds to the second write operation.

Following the processing of S303, the access control circuit 61 invalidates the write data that has been written to the LBA area 120 in the write buffer area 71 and the copy data of the write data in the media cache area 130 (S304). Then, the access control circuit 61 executes the processing of S301 again.

The invalidation of write data is to enable a region where the write data has been stored. The invalidation of write data may be erasing of the write data.

Note that, in the example illustrated in FIG. 8, a trigger of the second write operation in which the second write operation is executed when the magnetic disk device 100 is in the idle state is not limited to the example. The second write operation can be executed on the basis of an arbitrary trigger as long as the second write operation is executed in a period in which the first write operation is not executed.

Figure 9:
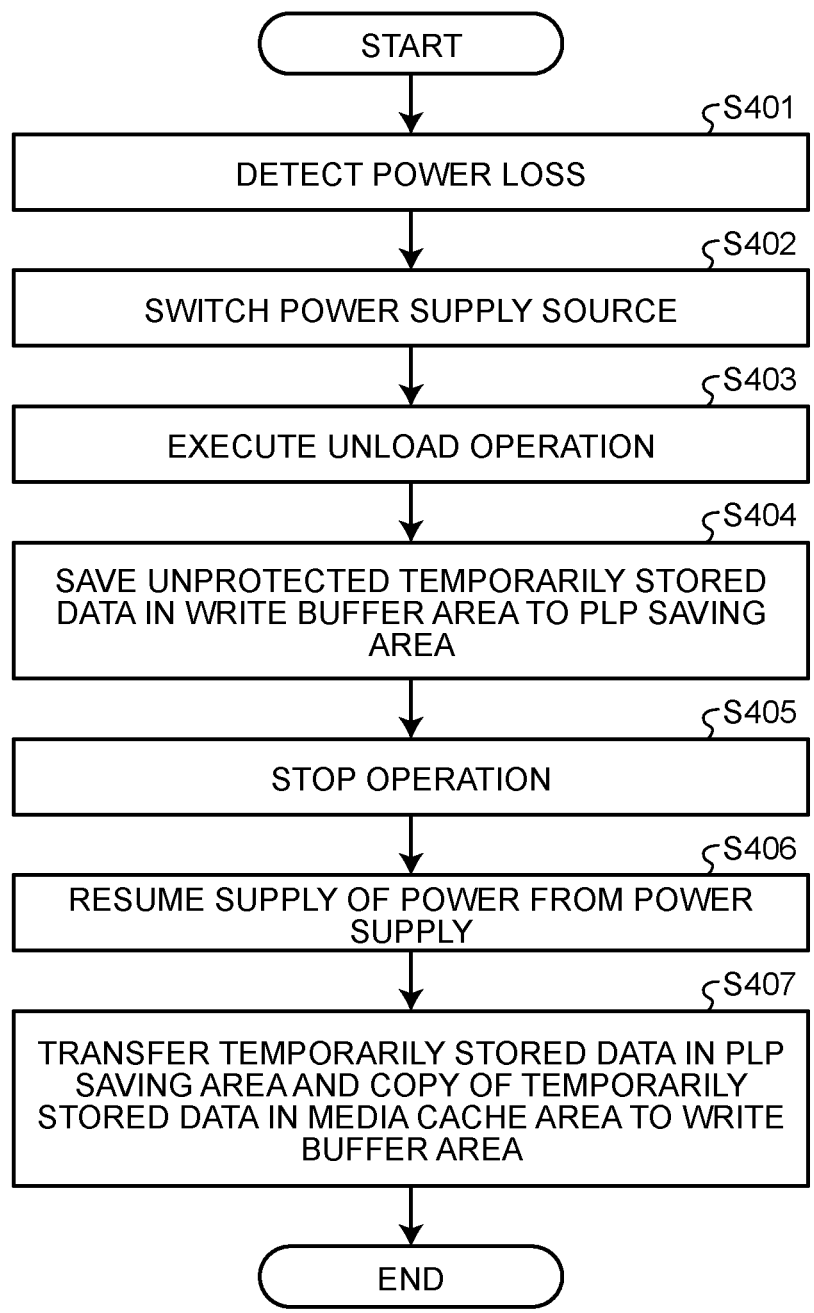
FIG. 9 is a flowchart illustrating an example of an operation when a power loss occurs according to the first embodiment.

FIG. 9 is a flowchart illustrating an example of an operation when a power loss occurs according to the first embodiment.

When occurrence of a power loss is detected by the power loss detector 51 (S401), the power supply switch 52 switches the supply source of the power to each circuit from the power supply 300 to the SPM power generation control circuit 93 (S402).

In response to the detection of the occurrence of the power loss, the hard disk control circuit 6 executes the unload operation (S403). In addition, the access control circuit 61 saves the unprotected temporarily stored data in the write buffer area 71 in the PLP saving area 81 (S404).

Note that the processing of S403 and S404 is executed by using the power generated by the back electromotive force of the SPM 2.

When the processing of S404 is completed, the magnetic disk device 100 stops the operation (S405).

Thereafter, when the supply of power from the power supply 300 to the magnetic disk device 100 is resumed (S406), the access control circuit 61 transfers the temporarily stored data in the PLP saving area 81 and the copy data in the media cache area 130 to the write buffer area 71 (S407). As a result, the temporarily stored data stored in the write buffer area 71 immediately before the power supply interruption is restored in the write buffer area 71. Then, the operation at the time of occurrence of the power loss ends.

In the above description of the first embodiment, the hard disk control circuit 6 writes a part or all of the unprotected temporarily stored data in the media cache area 130 in the first write operation.

However, the media cache area 130 may be discarded from the magnetic disk 1, and the hard disk control circuit 6 may be configured to write a part or all of unprotected temporarily stored data in the LBA area 120 in the first write operation. In such a configuration, the hard disk control circuit 6 also calculates the PLP set value by a series of operations illustrated in FIG. 6. In the PLP operation, the hard disk control circuit 6 saves the unprotected temporarily stored data in the PLP saving area 81. When the supply of power is resumed, the hard disk control circuit 6 transfers the write data saved in the PLP saving area 81 to the write buffer area 71.

In addition, the hard disk control circuit 6 estimates the SPM power generation amount and the unload power consumption amount, and calculates the PLP set value on the basis of these amounts obtained by the estimation.

However, one of the SPM power generation amount or the unload power consumption amount may be given as a set value by the designer. The hard disk control circuit 6 may be configured to estimate the other one of the SPM power generation amount or the unload power consumption amount.

As described above, in the first embodiment, the hard disk control circuit 6 calculates the coil resistance value of the VCM 3 on the basis of the current value and the voltage value of the power supplied to the VCM 3 measured by the VCM voltage/current monitor 95 (see, for example, S103 in FIG. 6). The hard disk control circuit 6 calculates the unload power consumption amount on the basis of the coil resistance value of the VCM 3 (see, for example, S104 in FIG. 6). The hard disk control circuit 6 calculates the PLP set value on the basis of the unload power consumption amount (see, for example, S108 in FIG. 6). The hard disk control circuit 6 executes the first write operation of writing a part or all of the unprotected temporarily stored data to the magnetic disk 1 when the amount of the unprotected temporarily stored data exceeds the PLP set value (see, for example, S204 and S205 in FIG. 7.). When the supply of power from outside is interrupted, the hard disk control circuit 6 executes the unload operation and the saving of the unprotected temporarily stored data to the PLP saving area 81 by using the power generated by the back electromotive force of the SPM 2 (see, for example, S402 to S404 in FIG. 9).

Therefore, the frequency of the first write operation is reduced, and as a result, the write performance is improved.

In the embodiment, the hard disk control circuit 6 calculates the PLP power amount, which is an amount of power that is usable for saving data by the PLP operation among the SPM power generation amount, on the basis of the unload power consumption amount. The hard disk control circuit 6 calculates the PLP set value on the basis of the PLP power amount.

As a result, the PLP set value can be increased as compared with the comparative example, and the frequency of the first write operation can be reduced.

In the embodiment, the hard disk control circuit 6 calculates the coil resistance value of the SPM 2 on the basis of the current value and the voltage value of the power supplied to the SPM 2 measured by the SPM voltage/current monitor 94 (see, for example, S105 and S106 in FIG. 6). The hard disk control circuit 6 calculates the SPM power generation amount on the basis of the coil resistance value of the SPM 2.

As a result, the PLP set value can be increased as compared with the comparative example, and the frequency of the first write operation can be reduced.

In the embodiment, in the first write operation, the hard disk control circuit 6 copies a part or all of the unprotected temporarily stored data to the media cache area 130. The hard disk control circuit 6 executes the second write operation of writing the write data stored in the write buffer area 71 to the LBA area 120 at least in a period in which the first write operation is not executed.

In addition, in the embodiment, when the supply of power from the power supply 300 is resumed (see, for example, S406 in FIG. 9), the hard disk control circuit 6 transfers the copy written to the media cache area 130 and the write data saved in the PLP saving area 81 to the write buffer area 71 (see, for example, S407 in FIG. 9).

It is therefore possible to increase the capacity of the write buffer area 71 while preventing the write data that has not yet been written to the magnetic disk 1 from being lost from the magnetic disk device 100 due to a power loss. As a result, the write performance is improved.

In the embodiment, the hard disk control circuit 6 calculates the coil resistance value of the SPM 2 on the basis of the current value and the voltage value of the power supplied to the SPM 2 measured by the SPM voltage/current monitor 94 (see, for example, S105 and S106 in FIG. 6). The hard disk control circuit 6 calculates the SPM power generation amount on the basis of the coil resistance value of the SPM 2 (see, for example, S107 in FIG. 6). The hard disk control circuit 6 calculates the PLP set value on the basis of the SPM power generation amount (see, for example, S108 in FIG. 6). The hard disk control circuit 6 executes the first write operation of writing a part or all of the unprotected temporarily stored data to the magnetic disk 1 when the amount of the unprotected temporarily stored data exceeds the PLP set value (see, for example, S204 and S205 in FIG. 7.). When the supply of power from outside is interrupted, the hard disk control circuit 6 executes the saving of the unprotected temporarily stored data to the PLP saving area 81 by using the power generated by the back electromotive force of the SPM 2 (see, for example, S402 and S404 in FIG. 9).

Therefore, the frequency of the first write operation is reduced, and as a result, the write performance is improved.

In the embodiment, the PLP power amount, which is an amount of power that is usable for saving data by the PLP operation among the SPM power generation amount, and the PLP set value is calculated on the basis of the PLP power generation amount.

As a result, the PLP set value can be increased as compared with the comparative example, and the frequency of the first write operation can be reduced.

Second Embodiment

In the first embodiment, the buffer manager 62 calculates the coil resistance value of each of the motors 2 and 3 on the basis of the current value and the voltage value of the power supplied to each of the motors 2 and 3. A method of acquiring the coil resistance value of each of the motors 2 and 3 is not limited to the above method.

In a second embodiment, another example of a method of acquiring the coil resistance value of each of the motors 2 and 3 will be described. Hereinafter, matters different from those in the first embodiment will be described. The same matters as those of the first embodiment will not be described or will be briefly described.

Figure 10:
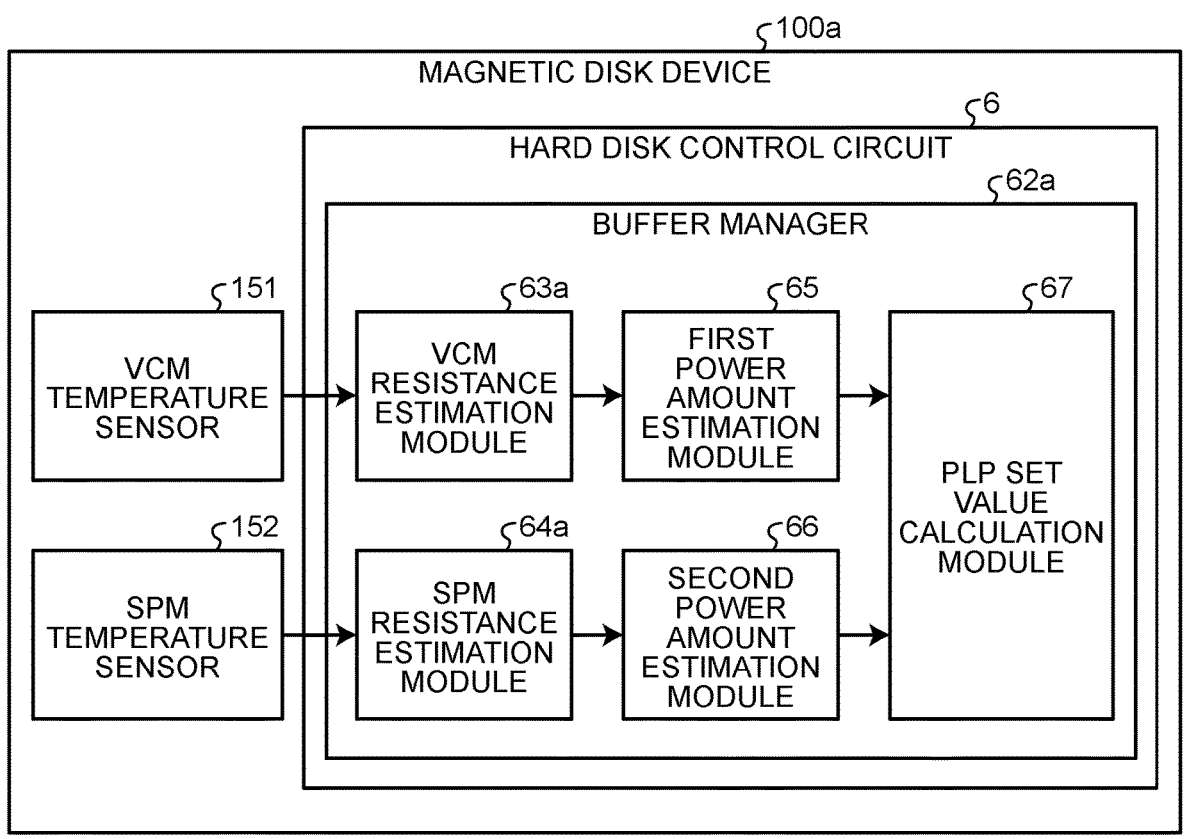
FIG. 10 is a diagram illustrating an example of a configuration of a magnetic disk device according to a second embodiment.

FIG. 10 is a diagram illustrating an example of a configuration of a magnetic disk device 100a according to the second embodiment. The drawing dos not illustrate the same configuration as that of the first embodiment is omitted.

The magnetic disk device 100a includes a VCM temperature sensor 151 and an SPM temperature sensor 152.

The VCM temperature sensor 151 is provided at a predetermined position inside the VCM 3 or near the VCM 3. The VCM temperature sensor 151 measures the coil temperature of the VCM 3.

The SPM temperature sensor 152 is provided at a predetermined position inside the SPM 2 or near the SPM 2. The SPM temperature sensor 152 measures the coil temperature of the SPM 2.

The hard disk control circuit 6 includes a buffer manager 62a instead of the buffer manager 62 according to the first embodiment. The buffer manager 62a includes a VCM resistance estimation module 63a, an SPM resistance estimation module 64a, the first power amount estimation module 65, the second power amount estimation module 66, and the PLP set value calculation module 67.

The VCM resistance estimation module 63a calculates an estimated value $R_{VCMest}$ of the coil resistance of the VCM 3 on the basis of the coil temperature of the VCM 3 measured by the VCM temperature sensor 151.

The coil resistance of the VCM 3 depends on the coil temperature of the VCM 3. A correspondence relationship between the coil temperature of the VCM 3 and the coil resistance of the VCM 3 is set in the magnetic disk device 100 in advance, and the VCM resistance estimation module 63a calculates the estimated value $R_{VCMest}$ of the coil resistance of the VCM 3 on the basis of the correspondence relationship. The VCM resistance estimation module 63a may further add a margin to a value determined on the basis of the correspondence relationship between the coil temperature of the VCM 3 and the coil resistance of the VCM 3 to obtain the estimated value $R_{VCMest}$ of the coil resistance of the VCM 3.

The SPM resistance estimation module 64a calculates the estimated value $R_{SPMest}$ of the coil resistance of the SPM 2 on the basis of the coil temperature of the SPM 2 measured by the SPM temperature sensor 152.

The coil resistance of the SPM 2 depends on the coil temperature of the SPM 2. A correspondence relationship between the coil temperature of the SPM 2 and the coil resistance of the SPM 2 is set in the magnetic disk device 100 in advance, and the SPM resistance estimation module 64 a calculates the estimated value $R_{SPMest}$ of the coil resistance of the SPM 2 on the basis of the correspondence relationship.

The first power amount estimation module 65, the second power amount estimation module 66, and the PLP set value calculation module 67 execute processing as in the first embodiment.

As described above, the hard disk control circuit 6 may calculate the coil resistance value of the VCM 3 on the basis of the coil temperature of the VCM 3 measured by the VCM temperature sensor 151, and calculate the unload power consumption amount on the basis of the coil resistance value of the VCM 3.

In addition, the hard disk control circuit 6 may calculate the coil resistance value of the SPM 2 on the basis of the coil temperature of the SPM 2 measured by the SPM temperature sensor 152, and calculate the SPM power generation amount on the basis of the coil resistance value of the SPM 2.

As described in the first embodiment and the second embodiment, the hard disk control circuit 6 may calculate the unload power consumption amount on the basis of the current value and the voltage value of the power supplied to the VCM 3, or may calculate the unload power consumption amount on the basis of the coil temperature of the VCM 3. That is, the hard disk control circuit 6 calculates the unload power consumption amount on the basis of the state of the VCM 3 while the VCM 3 is operating. The state of the VCM 3 while the VCM 3 is operating is the current value and the voltage value of the power supplied to the VCM 3, or the coil temperature of the VCM 3.

As described in the first embodiment and the second embodiment, the hard disk control circuit 6 may calculate the SPM power generation amount on the basis of the current value and the voltage value of the power supplied to the SPM 2, or may calculate the SPM power generation amount on the basis of the coil temperature of the SPM 2. That is, the hard disk control circuit 6 calculates the SPM power generation amount on the basis of the state of the SPM 2 while the SPM 2 is operating. The state of the SPM 2 while the SPM 2 is operating is the current value and the voltage value applied to the power supplied to the SPM 2 or the coil temperature of the SPM 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head configured to write to and read from the magnetic disk;
   a first motor configured to move the magnetic head relative to the magnetic disk in a radial direction;
   a second motor configured to rotate the magnetic disk;
   a nonvolatile memory;
   a volatile memory configured to store first data that is data received from a host device at least until the first data is written to the magnetic disk; and
   a controller configured to:
      calculate a first power amount that is an amount of power required for an unload operation of the magnetic head based on a first state of the first motor while the first motor is operating;
      calculate a first set value based on the first power amount;
      execute a first write operation of writing a part or all of second data to the magnetic disk when an amount of the second data exceeds the first set value, the second data being the first data that is stored in the volatile memory and has not yet been written to the magnetic disk; and
      execute the unload operation and saving of the second data to the nonvolatile memory by using power generated by a back electromotive force of the second motor when supply of power from outside is interrupted.

2. The magnetic disk device according to claim 1, further comprising
   a first measurement circuit configured to measure a current value and a voltage value of power supplied to the first motor, wherein
   the first state includes the current value and the voltage value measured by the first measurement circuit, and
   the controller is configured to calculate a first resistance value that is a coil resistance value of the first motor based on the first state, and calculate the first power amount based on the first resistance value.

3. The magnetic disk device according to claim 1, further comprising
   a first temperature sensor configured to measure a coil temperature of the first motor, wherein
   the first state includes the coil temperature of the first motor measured by the first temperature sensor, and
   the controller is configured to calculate a first resistance value that is a coil resistance value of the first motor based on the first state, and calculate the first power amount based on the first resistance value.

4. The magnetic disk device according to claim 1, wherein the controller is configured to acquire a second power amount that is an amount of the power generated by the back electromotive force of the second motor, calculate, based on the first power amount, a third power amount that is an amount of power that is usable for the saving of the second power amount, and calculate the first set value based on the third power amount.

5. The magnetic disk device according to claim 4, wherein the controller is configured to calculate the second power amount based on a second state of the second motor while the second motor is operating.

6. The magnetic disk device according to claim 5, further comprising
   a second measurement circuit configured to measure a current value and a voltage value of power supplied to the second motor, wherein
   the second state includes the current value and the voltage value measured by the second measurement circuit, and
   the controller is configured to calculate a second resistance value that is a coil resistance value of the second motor based on the second state, and calculate the second power amount based on the second resistance value.

7. The magnetic disk device according to claim 5, further comprising
   a second temperature sensor configured to measure a coil temperature of the second motor, wherein
   the second state includes the coil temperature of the second motor measured by the second temperature sensor, and
   the controller is configured to calculate a second resistance value that is a coil resistance value of the second motor based on the second state, and calculate the second power amount based on the second resistance value.

8. The magnetic disk device according to claim 1, wherein
   a first region and a second region mapped with a logical address that is usable by the host device are allocated to the magnetic disk,
   the first write operation includes an operation of copying a part or all of the second data to the second region, and
   the controller is configured to execute a second write operation of writing third data that is the first data stored in the volatile memory to the first region at least in a period in which the first write operation is not executed.

9. The magnetic disk device according to claim 8, wherein when the supply of power from the outside is resumed, the controller is configured to transfer the second data written to the second region and the second data saved in the nonvolatile memory to the volatile memory.

10. A magnetic disk device comprising:
    a magnetic disk;
    a magnetic head configured to write to and read from the magnetic disk;
    a motor configured to rotate the magnetic disk;
    a nonvolatile memory;
    a volatile memory configured to store first data that is data received from a host device at least until the first data is written to the magnetic disk; and
    a controller configured to:
       calculate a first resistance value that is a coil resistance value of the motor based on a state of the motor while the motor is operating;
       calculate a first power amount that is an amount of power generated by a back electromotive force of the motor based on the first resistance value;
       calculate a first set value based on the first power amount;
       execute a first write operation of writing a part or all of second data to the magnetic disk when an amount of the second data exceeds the first set value, the second data being the first data that is stored in the volatile memory and has not yet been written to the magnetic disk; and
       execute saving of the second data to the nonvolatile memory by using power generated by a back electromotive force of the motor when supply of power from outside is interrupted.

11. The magnetic disk device according to claim 10, further comprising
a measurement circuit configured to measure a current value and a voltage value of power supplied to the motor, wherein
the state includes the current value and the voltage value measured by the measurement circuit.

12. The magnetic disk device according to claim 10, further comprising
a temperature sensor configured to measure a coil temperature of the motor, wherein
the state includes the coil temperature measured by the temperature sensor.

13. The magnetic disk device according to claim 11, wherein the controller is configured to calculate a second power amount that is an amount of power that is usable for the saving of the first power amount, and calculate the first set value based on the second power amount.

14. A method of controlling a magnetic disk device including a magnetic disk, a magnetic head, a first motor configured to move the magnetic head relative to the magnetic disk in a radial direction, a second motor configured to rotate the magnetic disk, a nonvolatile memory, and a volatile memory,
the method comprising:
storing first data that is data received from a host device in the volatile memory at least until the first data is written to the magnetic disk;
calculating a first power amount that is an amount of power required for an unload operation of the magnetic head based on a first state of the first motor while the first motor is operating;
calculating a first set value based on the first power amount;
executing a first write operation of writing a part or all of second data to the magnetic disk when an amount of the second data exceeds the first set value, the second data being the first data that is stored in the volatile memory and has not yet been written to the magnetic disk; and
executing the unload operation and saving of the second data to the nonvolatile memory by using power generated by a back electromotive force of the second motor when supply of power from outside is interrupted.

15. The method according to claim 14, further comprising:
measuring a current value and a voltage value of power supplied to the first motor, the first state including the current value and the voltage value;
calculating a first resistance value that is a coil resistance value of the first motor based on the first state, and calculating the first power amount based on the first resistance value.

16. The method according to claim 14, further comprising:
measuring a coil temperature of the first motor, the first state including the coil temperature of the first motor;
calculating a first resistance value that is a coil resistance value of the first motor based on the first state, and calculating the first power amount based on the first resistance value.

17. The method according to claim 14, further comprising:
acquiring a second power amount that is an amount of the power generated by the back electromotive force of the second motor, calculating, based on the first power amount, a third power amount that is an amount of power that is usable for the saving of the second power amount, and calculating the first set value based on the third power amount.

18. The method according to claim 17, further comprising:
calculating the second power amount based on a second state of the second motor while the second motor is operating.

19. The method according to claim 18, further comprising:
measuring a current value and a voltage value of power supplied to the second motor, the second state including the current value and the voltage value of the power supplied to the second motor;
calculating a second resistance value that is a coil resistance value of the second motor based on the second state, and calculating the second power amount based on the second resistance value.

20. The method according to claim 18, further comprising:
measuring a coil temperature of the second motor, the second state including the coil temperature of the second motor;
calculating a second resistance value that is a coil resistance value of the second motor based on the second state, and calculating the second power amount based on the second resistance value.

* * * * *